(12) United States Patent
Dommety et al.

(10) Patent No.: US 6,771,604 B1
(45) Date of Patent: Aug. 3, 2004

(54) METHOD FOR LOCATION MANAGEMENT IN A COMMUNICATION NETWORK

(75) Inventors: Gopal Dommety, Columbus, OH (US); Malathi Veeraraghavan, Atlantic Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/158,404

(22) Filed: Sep. 22, 1998

Related U.S. Application Data
(60) Provisional application No. 60/060,750, filed on Sep. 22, 1997.

(51) Int. Cl.[7] ............................................. G01R 31/08
(52) U.S. Cl. ...................................... 370/238; 455/433
(58) Field of Search ............................. 370/238, 238.1, 370/310.2; 455/432, 433; 709/241

(56) References Cited

U.S. PATENT DOCUMENTS

| | | | | |
|---|---|---|---|---|
| 5,497,412 A | * | 3/1996 | Lannen et al. ............... | 455/408 |
| 5,680,440 A | * | 10/1997 | Ghisler et al. ............... | 455/432 |
| 5,815,810 A | * | 9/1998 | Gallant et al. ............... | 455/433 |
| 6,067,452 A | * | 5/2000 | Alexander .................. | 455/12.1 |
| 6,078,575 A | * | 6/2000 | Dommety et al. .......... | 370/338 |
| 6,081,715 A | * | 6/2000 | La Porta et al. ............ | 455/445 |
| 6,154,463 A | * | 11/2000 | Aggarwal et al. .......... | 370/408 |
| 6,282,170 B1 | * | 8/2001 | Bentall et al. ............... | 370/225 |

FOREIGN PATENT DOCUMENTS

| | | | | |
|---|---|---|---|---|
| EP | 0 849 975 A2 | * | 12/1997 | ........... H04Q/11/04 |

OTHER PUBLICATIONS

C. Perkins, *IP Mobility Support*, RFC 2002 (1996).
Santhanam Srinivasan, *Low Overhead Fault Tolerance Schemes for Distributed Systems* (1995) (Ph.D. thesis, Princeton University).

* cited by examiner

*Primary Examiner*—Alpus H. Hsu
*Assistant Examiner*—Thien D Tran

(57) ABSTRACT

Disclosed is a location management method for a communication network. In a first embodiment, a procedure for finding an optimal path between a calling switch and a visiting switch node is integrated in the call set up procedure. The connection set up procedure starts by setting up a connection path between the calling switch and the home switch. Then, an "optimal crossover node" is determined along the connection path and then the connection path is cranked back starting from the home switch and moving towards the optimal crossover node. Once the optimal crossover node is reached, the a connection set-up proceeds to set up a connection between the optimal crossover node and the visiting switch. In an alternative embodiment, first a connection is set up between the calling switch and the home switch. Then the connection is extended to the visiting switch either by the call-forwarding or by two-phase crankback method. This results in a quickly routed, but sub-optimal connection. Once the connection extension is completed by call forwarding or by the two phase crankback scheme, the route is optimized by selecting a segment on the sub-optimal connection for route optimization and then utilizing the method of the first embodiment to establish an optimally routed connection.

38 Claims, 7 Drawing Sheets

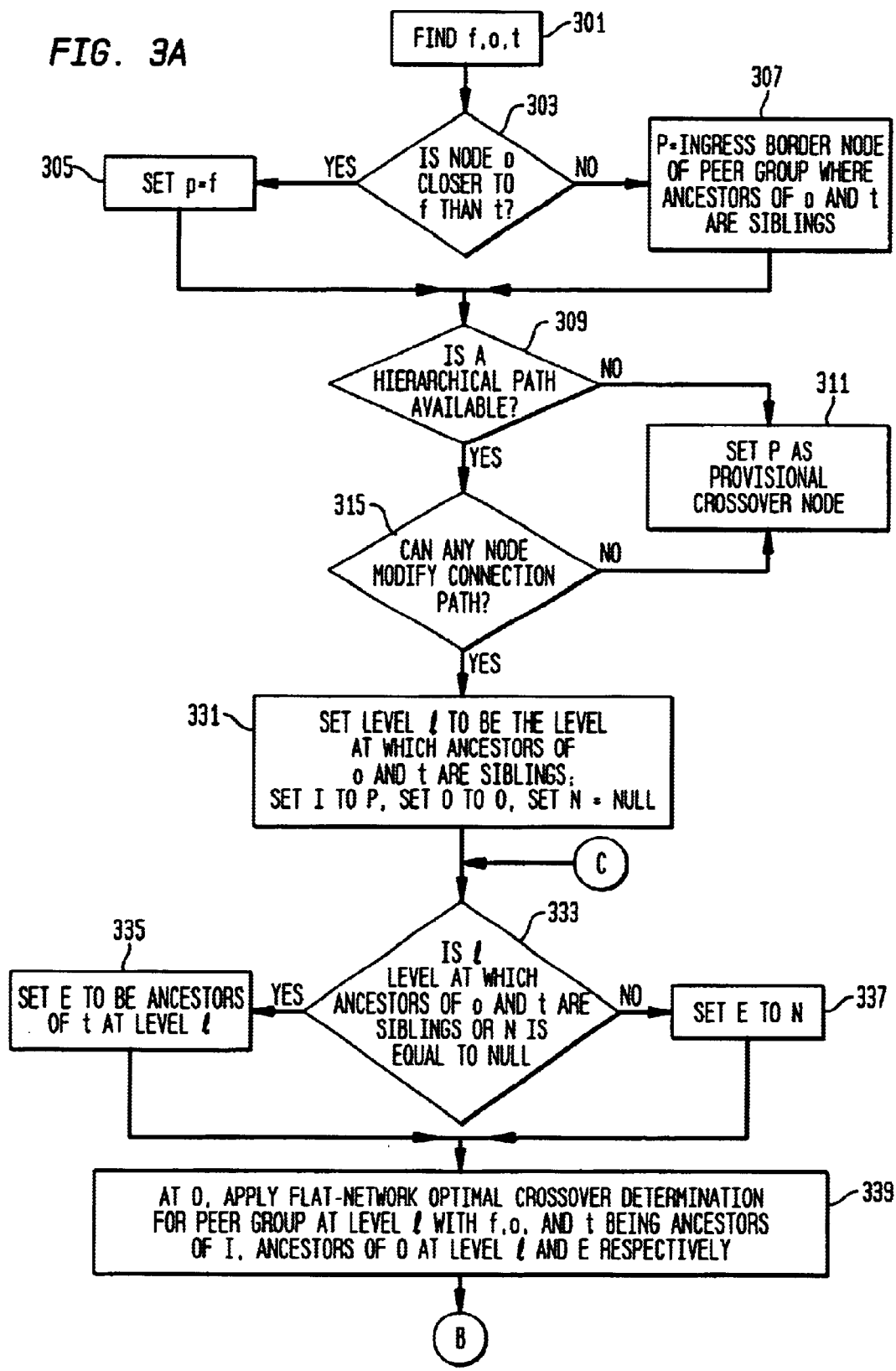

METHOD FOR LOCATION MANAGEMENT
IN A COMMUNICATION NETWORK

REFERENCE TO PROVISIONAL APPLICATION

This application is based on a Provisional Application, Serial No. 06/060,750, filed on Sep. 22, 1997.

FIELD OF THE INVENTION

The present invention relates to communications networks including mobile asynchronous transfer mode (ATM) and Internet-Protocol (IP) networks. More particularly, the invention relates to route optimization and location management in communication networks.

The term "calling party's switch," as used herein, is the network node from which a call originates, i.e., a call is generated from one of the endpoints of the calling party's switch, or a network node along the path of the call that is enabled to perform route optimization or is mobility-enhanced.

The term "home switch," as used herein, is the switch to which an endpoint is assumed to be connected in the default mode. The address of the endpoint is derived from the network address of its home switch.

The term "visiting switch" as used herein, is the switch at which an endpoint is currently located.

The term "local switch," as used herein, is an intermediate node between the calling party's switch and the home switch to which a call is cranked back during call setup before continuing on to the visiting switch.

The term "network node," as used herein, is a system in a communications network that performs a switching or routing functions. A network node can be an access node if it has links to endpoints (users). A network node can be a transit node if all its links are to other network nodes with no links to endpoints. Examples of network nodes are ATM switches, IP routers, SONET cross-connects, telephony switches, WDM (Wavelength Division Multiplexed) optical cross-connects and other similar systems.

In a mobile network, the term "network node," refers to an access point or a base station (which may include an ATM switch).

The term "mobile user," as used herein, refers to a person connected to (or who will be connecting to) a node that is not a mobile user's home switch. A mobile user doesn't necessarily need a wireless interface.

The term "call," as used herein, refers to any connection (e.g., voice, data, etc.) between an originating party and a receiving party over a communication path.

The term "call-forwarding," as used herein, refers to a method in which a connection set up is continued from the home switch to the visiting switch of a called user.

The term "communication path," as used herein, refers to the path from the originating party to the receiving party over the network.

The term "crankback," as used herein, refers to a back-tracking of the connection setup procedure (partial release of reserved resources).

BACKGROUND OF THE INVENTION

The use of ATM and IP technology in mobile communication networks is becoming increasingly common. In mobile ATM networks, "handoff procedures" and "location management procedures" are needed to support user mobility.

Location management is the process of tracking mobile users and locating them for delivering yet-to-be-established incoming call to the mobile user. In the process of conducting location management, the paths proposed for establishing the connections can become "sub-optimal," i.e., the paths to be used may not be the best paths between the two endpoints of the connections.

Mobile user tracking procedures update the home node of a mobile user with information about the location of the mobile user. This information is used to deliver incoming calls to mobile users at their current location.

One prior art location management method is called "complete release" and is described with reference to FIG. 1A. By this method, a mobile user 110 has a home switch 116, but mobile user 110 is located near a visiting switch 118. A calling party 114 attempting to call mobile user 110 will have the call routed to home switch 116 along connection 112. Location information will be transferred back to the calling party 114 "advising" calling party 114 that the mobile can be reached via visiting switch 118, whereupon connection 112 will be completely dropped, and connection 120 will be established to connect the call.

In the method illustrated in FIG. 1A, since the entire connection is being rerouted (i.e., there is no common path between the first connection 112 and the second connection 120), latency is an issue. Considerable time and network resources are spent establishing the new connection 120 over an entirely new path, while dropping the first connection 112.

Another prior art location management method, "call forwarding," is illustrated with reference to FIG. 1B, by which a call is forwarded from the home switch of the mobile user to the visiting switch of the mobile user. Referring to FIG. 1B, the path between calling switch 114 and the visiting switch 118 is established by simply extending a new path 122 (shown in dotted line) to the visiting switch 118 from the old network node 116, in a "connect-the-dots" fashion. Using this method, lower call setup latencies can be achieved because the old and new base stations are simply interconnected as needed. However, the path taken by the connection will often be sub-optimal, because the new path added on to the old one may follow a circuitous route.

Another prior art scheme, called a two-phase crankback scheme, allows for the call setup procedure to be cranked back from the home switch to a local network node, and then rerouted. This crankback is executed at a local level, which means that the overall end-to-end path taken by the connection could still be sub-optimal.

None of the prior art location management methods determine whether the route established between the originating point and the network node closest to the mobile user is optimal, nor do they optimize the connection path to establish such an optimal route. Suboptimality that is introduced during connection setup is primarily due to lack of exact information about the location of the mobile user at the call originating switch, and suboptimality occurs after connection setup because of movements by communicating mobile user. These suboptimal paths result in an inefficient usage of network resources.

Thus, there exists a need for a location management system which provides an efficient location management scheme/method to optimize routes of connections such that an efficient usage of network sources results.

SUMMARY OF THE INVENTION

Two location management schemes are disclosed herein. In a first embodiment, a procedure for finding an optimal path between a calling switch and a visiting switch node is integrated in the call set up procedure. The connection set up procedure starts by setting up a connection path between the calling switch and the home switch. Then, an "optimal crossover node" is determined along the connection path and then the connection path is cranked back starting from the home switch and moving towards the optimal crossover node. Once the optimal crossover node is reached, the a connection set-up proceeds to set up a connection between the optimal crossover node and the visiting switch.

In an alternative embodiment, first a connection is set up between the calling switch and the home switch. Then the connection is extended to the visiting switch either by the call-forwarding or by two-phase crankback method. This results in a quickly routed, but sub-optimal connection. Once the connection extension is completed by call forwarding or by the two phase crankback scheme, the route is optimized by selecting a segment on the sub-optimal connection for route optimization and then utilizing the method of the first embodiment to establish an optimally routed connection.

The method of determining an optimal connection path and rerouting the existing connection path to this optimal connection path, as described in the first embodiment, is applicable to all communication networks deploying connection-oriented technologies. These communications networks include land-line networks and mobile networks. Similarly, the method of route optimization for optimizing a suboptimal connection, as described in the second embodiment, is applicable to all communication networks deploying connection-oriented technologies. These communications networks include land-line networks and mobile networks.

Within communications networks, the kinds of networks to which the present invention is applicable includes flat networks, hierarchical networks, and PNNI-hierarchical networks.

BRIEF DESCRIPTION OF THE DRAWINGS

FIGS. 3A, and 3B comprise a flowchart illustrating the various steps required for crossover determination for a hierarchical network in accordance with the present invention;

DETAILED DESCRIPTION OF THE PREFERRED EMBODIMENT

As described above, the present invention involves the rerouting of a yet-to-be-established connection to achieve an optimal communication path or route. In a first embodiment, the optimal communication path is achieved by setting up a connection route between the calling switch and the home switch, and then locating an optimal crossover node, which is defined as an access node or a transient node at which there will be as much overlap as possible between the old path and the new path. Once the location of the optimal crossover node is determined, a route is established along the new path (which includes the portion of the old path that coincides with the new path), and the new route is used by the network to establish an optimal connection between the calling-switch and current location of the mobile user (visiting location).

Figure 1A:
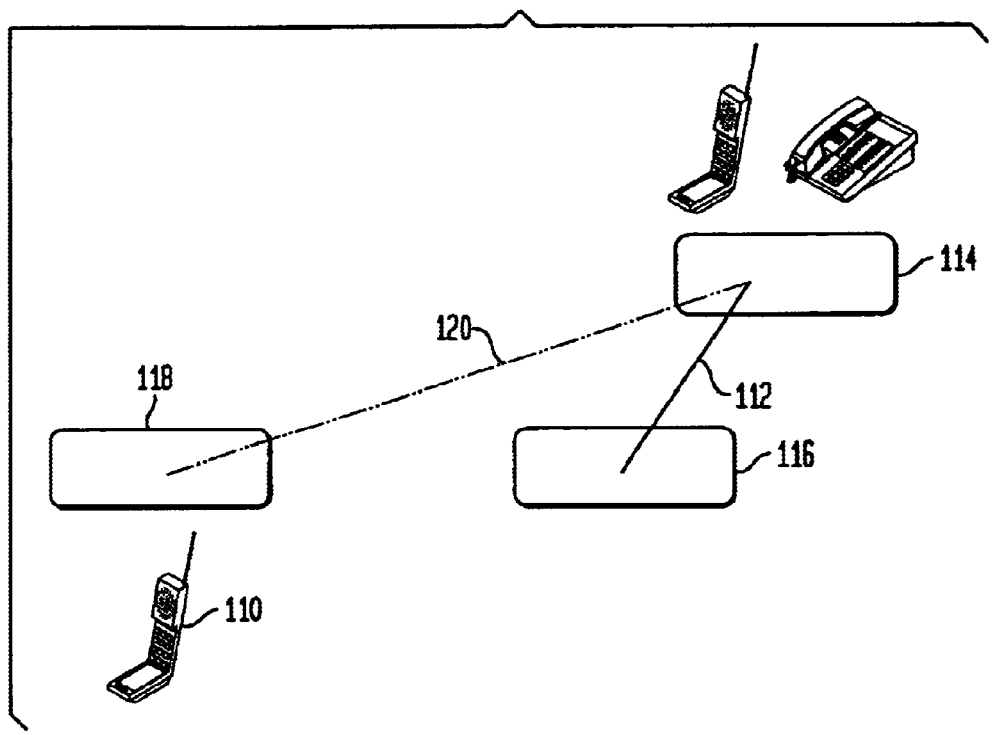
FIG. 1A is a block diagram of a prior art location management scheme.
Figure 1B:
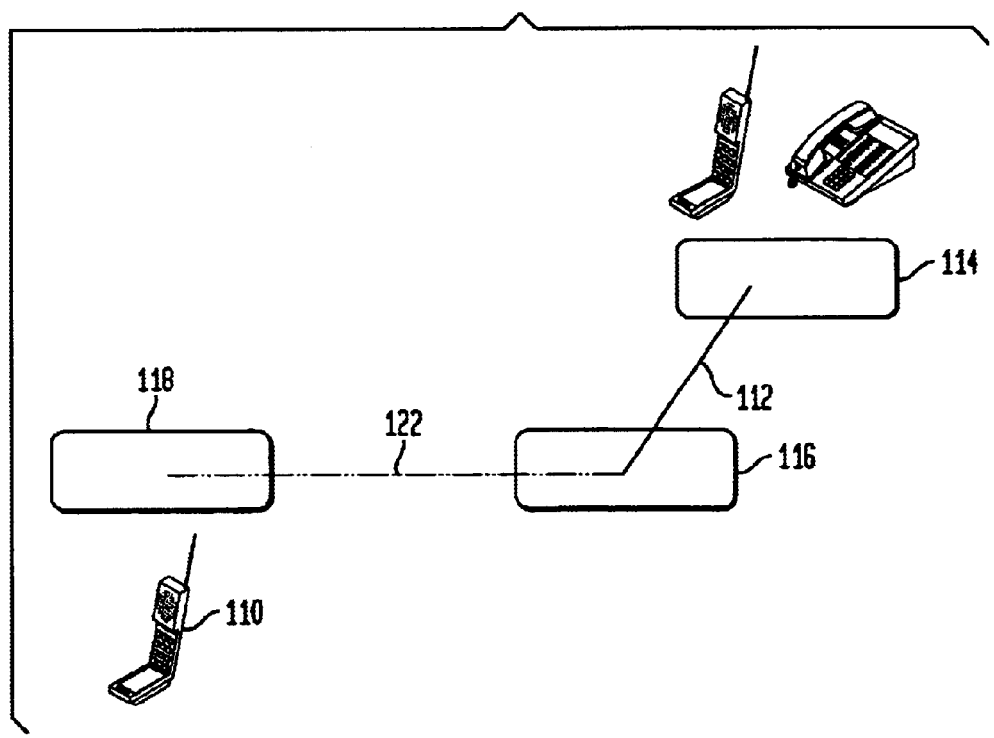
FIG. 1B is a block diagram of different prior art location management scheme.
Figure 2:
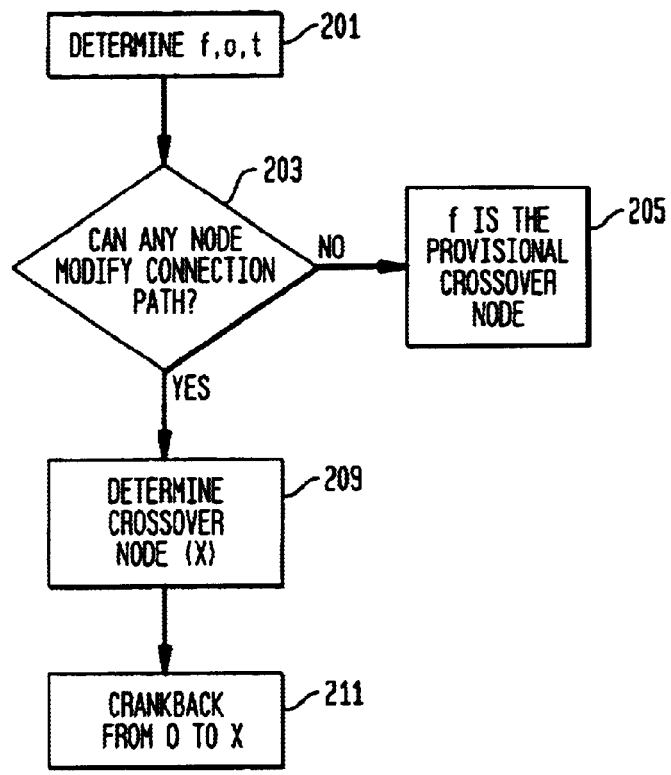
FIG. 2 is a flowchart illustrating an example of the steps involved in determining the location of a crossover node X in accordance with the present invention.

FIG. 2 is a flowchart illustrating an example of the steps involved in determining the location of an optimal crossover node X for flat networks (as discussed below, the steps involved in the determination of the location of the optimal crossover node for hierarchical networks varies from those used for flat networks). For the purposes of this example, assume there exists three network nodes—a first network node f and a second network node o, and a third network node t. In one-phase location management scheme, the calling party's switch is f, the home switch is o and the visiting switch is t (e.g. because the receiving party is away from the home switch).

At step 201, a connection path is established between first network node f and second network node o, and it is determined and that a new path is desired between the first network node f and the third network node t.

Some networks allow only the originating network node (first network node f in this example) to modify (reroute) the connection. Thus, at step 203, a determination is made as to whether any node can modify the connection path or only the originating network node. If the connection can be rerouted only by first network node f, then the process proceeds to step 204, where it is determined that first network node f is the optimal crossover node X.

However, if at step 203 it is determined that any network node (node) can modify the connection path, the process moves to step 209.

In step 209, the optimal crossover node X is determined. The optimal crossover node X is a network node on the f-o path to be selected as the point to which the connection will be crank backed and then a new connection will be setup form the X to t.

To determine the optimal crossover node X, the network computes the shortest path along preexisting network nodes between f and t (the f-t path), and then compares the f-t path to f-o path. The endpoint of the coinciding portions of the f-t and f-o paths defines the location of the optimal crossover node (X), and this endpoint is the point along the coincident portion f farthest from f. The path f-X-t is the desired new connection because the f-X-t path is the shortest path between f and t which takes into account the coincident portions of the f-t and f-o paths. In this case, the X-t segment is the new segment, and the X-o segment is the corresponding old segment.

Figure 2A:
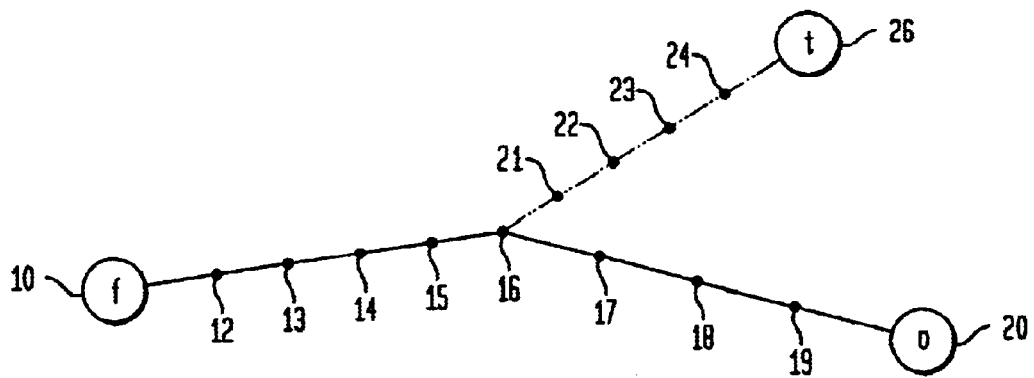
FIG. 2A is a diagram illustrating the steps of FIG. 2.

FIG. 2A illustrates the steps of FIG. 2 by way of example. In FIG. 2A, f (calling switch) is 10 and o (home switch) is 20. First a connection is set up between f and o. This connection path follows nodes {10, 12, 13, 14, 15, 16, 17, 18, 19, 20}. A new connection is desired between node 10 and node 26. The shortest path between f and t follows nodes {10, 12, 13, 14, 15, 16, 21, 22, 23, 24, 26}. Node 16 is the optimal crossover node X because f-o and f-t overlap along the path location of node 16. Once X is established, the connection is cranked back to X, a new segment is set up between X-t, and X-o segment is dropped.

The procedure of establishing an optimally routed connection is similar for hierarchical networks but the optimal crossover node determination varies. In order to better understand the application of the present invention in a hierarchical network, an explanation of hierarchical network follows.

A hierarchical network is a network where the nodes are grouped in various groups at multiple levels. A group is a plurality of nodes logically connected to form a group. Each peer group has an elected group leader. Nodes within a group exchange detailed information about topology, routing and loading. The group leader of each group represents all nodes within its peer group at the higher-level and sends summarized topology or loading information about its group to its ancestors at a higher level.

The levels within a hierarchical network may be logical or physical. The node groups are used by the network for switching and setting up calls.

The hierarchical networks are preferred for scalability reasons. A PNNI based network is a one particular type of hierarchical network. In a PNNI network, the nodes are arranged in a hierarchical manner with peer groups located at each hierarchical level. A peer group is a plurality of nodes logically connected to form a group. Each peer group has an elected Peer Group Leader (PGL). Nodes within a peer group exchange topology, routing and reachability information using the PNNI routing protocol. The PGL of each peer group represents all nodes within its peer group at the higher-level and sends summarized topology/loading/reachability information about its lower-level peer group to its peers in the higher-level peer group. Each higher-level peer node broadcasts this summarized information to all its nodes in the lower-level peer group. Using this technique, each node has topology/loading/reachability data about its own peer group and all its ancestor peer groups. The ancestor peer groups are corresponding peer groups at higher levels.

In a typical hierarchical network, PNNI signaling protocol standard is used in connection setup and connection release procedures. In order to set up a connection, the switch receives the connection setup request and determines the hierarchical source route for that connection. The computed hierarchical source routes are carried as DTL (Designated Transit List) parameters in the PNNI signaling SETUP messages. A DTL is a list of all node identifiers.

To set up a connection in a PNNI network, a stack of DTLs is used to specify the complete path of a connection from the current node to the destination with one DTL for each level. However, the exact list of nodes is not known due to the hierarchical nature of source routes. Therefore, the exact path within each peer group is computed at the ingress border node of the peer group, wherein the ingress border node is the node through which the connection setup procedure enters the peer group. The ingress border node then pushes a DTL specifying the path for that peer group on the stack of the DTLs. While computing the path through a peer group, the ingress border node of a peer group uses the next entry in the next DTL (the one corresponding to the next higher level peer group) as the target for exiting this peer group.

In case there is only one DTL remaining (i.e. the next DTL does not exist) the destination address is used to determine the route. The egress border node of a peer group pops DTLs from the stack that are exhausted (wherein the egress border node is the last node through which the connection being setup leaves the peer group). A call being set up according to a specified stack of DTLs may be blocked at a node due to a lack of sufficient resources or connectivity. In such situations, the call is cranked back (released) to the border node that created the unusable DTL and an alternate route is attempted. In a hierarchical network optimality of connection paths is regarded within the context of the hierarchical organization of switches. In other words, because of the hierarchical organization, the best path computed by the network may not be the true shortestpath.

Figure 3B:
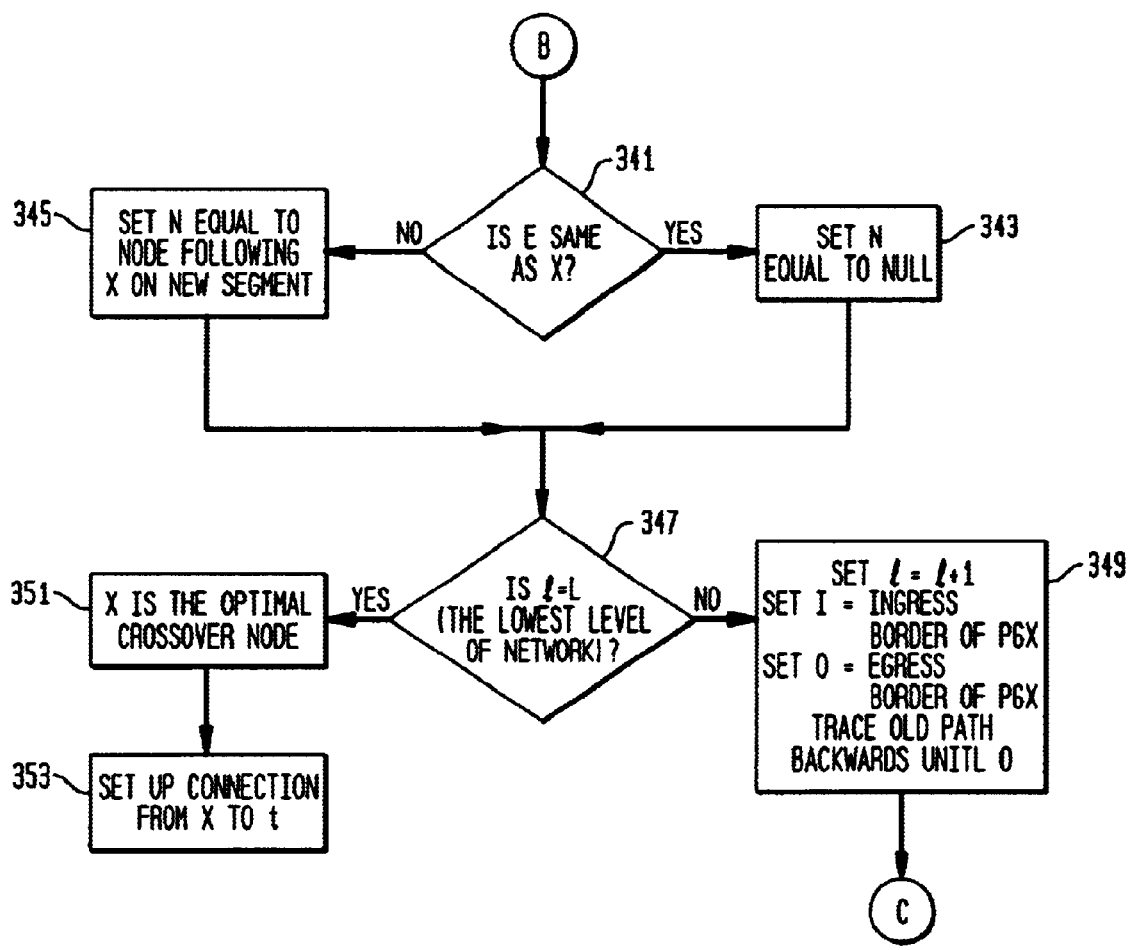

FIG. 3A and 3B illustrate the different steps required for optimal crossover determination for a hierarchical network.

The process starts in 301 by selecting f, o, t nodes. The next step 303 is a decision function to determine whether node o is closer to node t or to node f. If node o is closer to node f than to node t the network computes in step 305 that f node must be a provisional crossover node (termed p).

However, if in step 303, it is determined that node o is not closer to node f than to node t, the process moves the step 307 where provisional crossover node p is computed by finding the ingress border node of the peer group in which ancestors of node o and node t are siblings.

The next step 309 is a decision function to determine whether a hierarchical path is available. In some hierarchical networks, a requirement does not exist that nodes must retain the hierarchical path after the connection has been established. Under these constraints, the answer to the decision function is "no" and the process moves to step 311 where provisional crossover node is determined as to be the required optimal crossover node (X). This provisional crossover node is used to set up a new segment X-t, step 311.

However, if the answer to the decision function 309 is "yes", indicating that under current hierarchical network standards, knowledge of the hierarchical path is retained, the process moves to another decision function, step 315, to determine if there is any other node, besides the node which initiated source routing (or created the DTL), which can modify the connection path. In some hierarchical networks, e.g., in a PNNI hierarchical network, a condition exists that the node which initiated the source routing can only compute and modify the connection path. Under these constraints, the answer to decision function at step 315 is "no"and the process moves to step 311 where provisional crossover. node is determined as to be the required optimal crossover node (X). This provisional crossover node is used to set up a new segment X-t.

Next, at step 331, a level l is chosen at which ancestors of node o and ancestors of node t are siblings. Also at step 331, a new parameter I is set equal to p (provisional crossover node), another new parameter O is set equal to o, and another new parameter N is set equal to zero. The parameters I, O, N are introduced as tracking functions which assist in keeping track of essential information as the optimal crossover node determination procedure iterates from one level to another level in the hierarchy.

The next step 333 is a decision function to determine whether level "l" is the level at which ancestors of o and t are siblings OR N is equal to null (zero). In first iteration, the answer to this decision function will always be yes, and the process will move to step 335 to set a new parameter E equal to the ancestor of t at this level (l). The parameter E is also introduced as a tracking function which assists in keeping track of essential information as the optimal crossover node determination procedure iterates from one level to another level in the hierarchy.

However; if the answer to decision function 333 is "no", the process moves to step 337 to set a new parameter E equal to N.

The process then moves to step 339 a flat network determination step (step 209 of FIG. 2) is applied at O to determine a optimal crossover node X for a peergroup at level 1 with f, o, t being the ancestor of I at level l, the ancestor of O at level l, and E respectively.

At next step 341 (FIG. 3B), it is determined whether node E coincides with optimal crossover node X. If yes, N is set to be zero (null) at step 343. If no, at step 345, N is set to be equal to the node following optimal crossover node X on the new segment (towards t).

The next step 347 is a decision function to determine whether the lowest level in the hierarchical network has been reached. If the answer is "yes", the lowest level has been achieved and at step 351 a determination is made that optimal crossover node X is the optimal crossover node, and at step 353 a connection is setup between node X to node t.

However, if at decision function 347 it is determined that the lowest level has not been achieved. The process moves to step 349, where l is set to be equal to l+1 to indicate that a next level (a lower level in the hierarchy having PG X) has been selected. Also, I is now set to be the ingress border node of peer group comprising X (PG X) on the old path wherein the ingress border node is located on the lowest level. O is now set to be egress border node of PG X on the old path wherein the egress border node is also located on the lowest level. Also at step 349, the old path is traced backwards until O is reached.

Upon completion of step 349 the process then returns to step 333 (FIG. 3A) to start the next iteration of steps 333–349. In the next iteration, the flat network determination procedure is run at the next level (l+1). The iteration of 333–349 is repeated until the lowest level which is an actual physical level is reached, where X is the optimal crossover node at step 351, and a connection is set up from X to t at step 353.

In sum, to complete finding of the optimal crossover node in a hierarchical network with multiple levels, the flat-network optimal crossover node determination is first exercised in the peer group where ancestors of o and t are siblings. This step may lead to a determination of an optimal crossover peer group, this optimal crossover peer group containing the optimal crossover node. However, given the hierarchical structure of the network, the o and the t has no detailed information about the inside structure of the optimal crossover peer group. For this purpose, the old connection is traced from o until the egress border node of the identified optimal crossover peer group on the old connection is reached. This egress node then performs the comparison routine for the paths through the optimal crossover peer group to determine the next lower level optimal crossover peer group.

As the higher levels are only logical levels, the above iteration of determining the next lower level optimal crossover peer group is repeated until a physical level is determined where the optimal crossover node is located.

Figure 4:
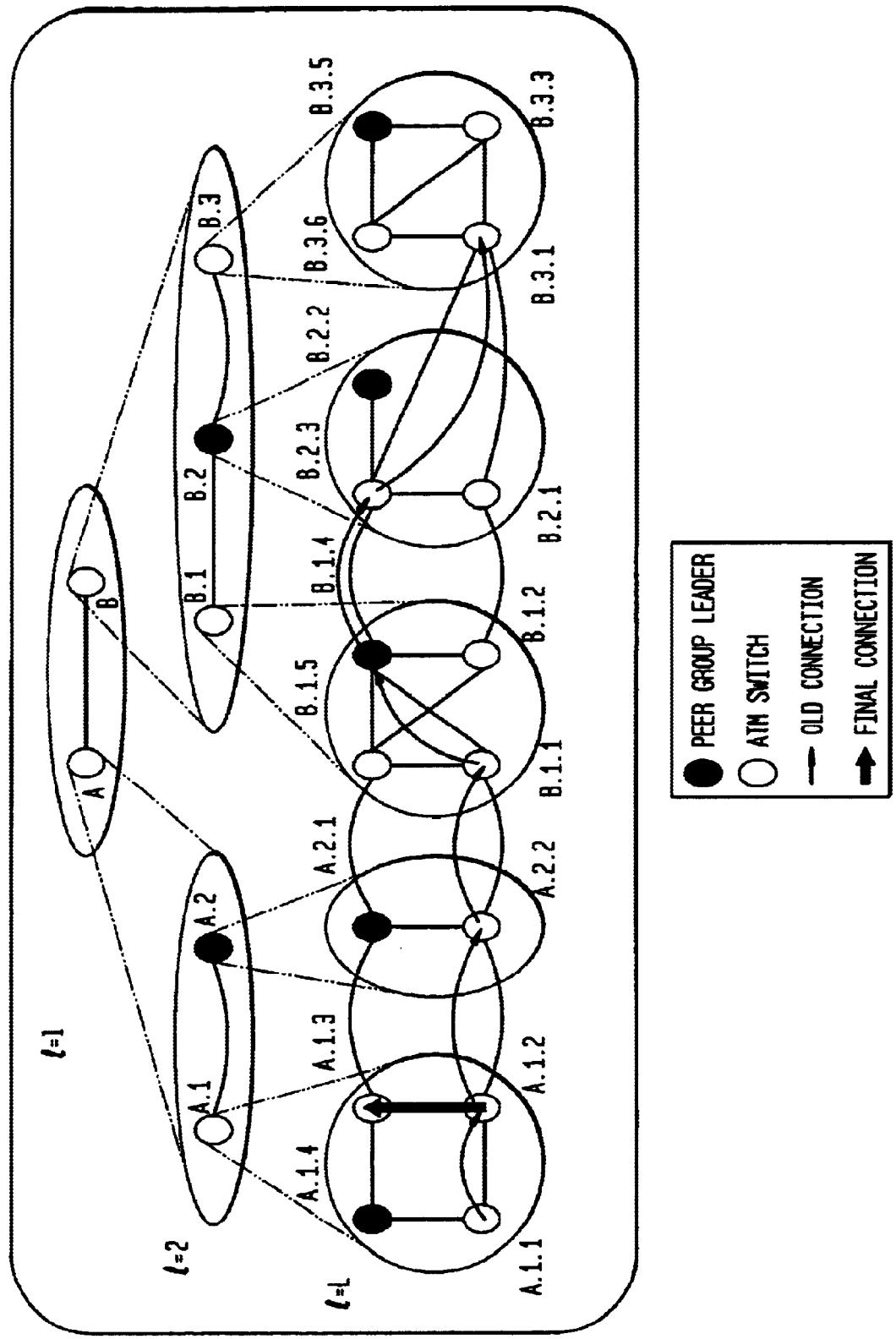
FIG. 4 is a diagram illustrating the steps set forth in FIGS. 3A–3B.

FIG. 4 is an exemplary illustration of the steps described in FIGS. 3A and 3B. In this hierarchical network, there are three level l=1,2,3; l=1 being the top most level, l=3 being the lowest level.

In this example, The level 3 has five different peer groups PG1, PG2, PG3, PG4, PG5. Each peer group having its own PGL. The PG1 has four nodes, {A.1.1, A.1.2, A.1.3, A.1.4}, A.1.4 being the PGL. The PG2 has two nodes {A.2.1, A.2.2}; A.2.2 being the PGL. The PG3 has four nodes {B.1.1, B.1.2, B.1.4, B.1.5}; B.1.4 begin the PGL. The PG4 has three nodes {B.2.1, B.2.2, B.2.3}; B.2.2 being the PGL and the PG5 has four nodes {B.3.1, B.3.3, B.3.5, B.3.6}; B.3.5 being the PGL.

The level 2 is a logical level. It has two peer groups—PG6, PG7. The PG6 comprises ancestors of first two peer groups of the lower level (A.1 and A.2 nodes). The PG7 comprises the ancestors of remaining peer groups of the lowest level (B.1., B.2 B.3 nodes). The level 1 in the network comprises one peer group PG8 comprising ancestors of level 2 (A, B nodes).

In this example, node A.1.1 has the detailed information of all the members of its peer group (A.1.2, A.1.3, A.1.4 nodes) and its ancestors. The ancestors of node A.1.1 are A.1 (in level 2), A (in level 1).

For the purpose of this example, assume that a connection exists between A.1.1 and B.3.1 and a connection is desired between A.1.1 and A.1.3.

At step 301, f=A.1.1, o=B.3.1, t=A.1.3. Assume at step 303 that node o is equidistant to f and t, therefore provisional crossover node p is f, i.e., A.1.1 at step 305. Assuming, steps 309,315 answer as "yes", then at step 331, at level l=1, I=A.1.1, O=B.3.1, and N=0.

Next, decision function 333 obtain an answer "yes" because n=0; then at step 335, E is set to be equal to A (ancestor of t at level l=1). At step 339, a flat network optimal crossover node determination is run at PG AB where f={A} (ancestor of I at level 1), o={B} (ancestor of O at level 1), and t=E={A}. Thus, optimal crossover node X is A.

At step 341, it is determined that E (equal to A) is the same as X (equal to A), thus N is set equal to zero (null) at step 343. At step 347, it is determined that l is not the lowest level and, therefore, at step 349, next level l=2 (i.e, l+1) is selected. I is the ingress border of PG AB at the lowest level, thus, I is equal to A.1.1. O is the egress border node of PG AB, thus O is equal to A.2.2. Then, the old path is traced until A.2.2.

The iteration then returns to step 333 and answer at step 333 is now "yes" because even though ancestors of o and t are not siblings at this level (l=2), N is equal to zero. The process moves to step 335 where E is set be equal to A.1 (ancestor of t at this level, l=2). Next, at step 339, the flat-network optimal optimal crossover determination is applied at O (A.2.2) wherein f=A.1 (ancestor of I at level 2), o=A.2 (ancestor of O at level 2), t=E, i.e., A.1. Thus the optimal crossover node X at this level is A.1.

At step 341, it is determined that E is same as X, and N is set to zero at step 345.

At 347, it is determined that level 2 is not the lowest level of the network, thus at step 349, next level is selected (l=3), I=A.1.1 (ingress border node of PG A.1 at the lowest level), O is A.1.2 (egress border node of PG A.1 at the lowest level). The old connection is traced until A.1.2, and the iteration return to step 333.

The step 333 is now "yes" as N is set equal to zero, at step 335, E is set to be A.1.3 (ancestor of t at level 3, level 3 being the lowest level). At step 339, O=A.1.2, and flat-network determination procedure is applied at level 3 with f=A.1.1, o=A.1.2, t=A.1.3. The optimal crossover node X is A.1.2.

At step 341, as E is not equal to X, so N is set to be node following X toward t , N=A.1.3.

At step 347, it is determined that the lowest level of the network has been reached, thus, X is the optimal crossover node for the network (step 351). At step 353, the connection is set between X (A.1.2) and t (A.1.3).

The above describes the steps involved in a base rerouting for a hierarchical network in the form of an example.

FIG. 3A and 3B are also applicable for a PNNI hierarchical network, as follows. Step 301 is same where f, o, and t are determined. At step 303 it is determined, if node o is closer to f or to t. If o is closer to f than to node t, then there is not any path common between f-o segment and the new desired connection f-t, the crossover node is the node f (step 305). If node o is not closer f than to t, the optimal crossover node is the ingress node of peer group where node t and node o are located.

In a particular case, if node t is closer to the node f than to the node o or is equi-distant to the node f and the node o, there is no segment common between the existing connection and the new desired connection. Then, the optimal crossover node is again f.

In a PNNI hierarchical network, the optimal crossover node determined in step 307 is a constrained-optimal crossover node because under every node has only the summarized information regarding the topology of the network (nodes outside of a peer group do not have information regarding internal structure of the peer group). The connections are routed using only source routing. Thus, when a connection is routed to a target node outside the peer group, such connection terminates at the ingress border node of the peer group comprising such target node. The routed connection cannot be extended up to the target node as the internal details of the peer group comprising target node are unknown to the nodes outside the peer group, thus, the ingress node is the desired optimal crossover node.

The above explanation described a one phase location management scheme where optimally routed connection is obtained by first establishing a connection between the calling switch and the home switch, them determining an "optimal crossover node" along the connection path, cranking back the connection path from the home switch to the optimal crossover node, and setting up a new connection path between the optimal crossover node and the visiting switch. Thus the optimally routed connection is established so that it travels along the existing path until it reaches the optimal crossover node, where the path then varies from the original route and a new segment between the optimal crossover node and the new location is established.

In an alternative embodiment, a two-phase location management scheme is utilized. In the first phase of this two-phase location management scheme, a connection is established between the calling switch and the home switch. Then, a fast local rerouting of the connection to the visiting switch is performed. The fast local rerouting may be performed by call-forwarding scheme or a two-phase crankback scheme. In the call-forwarding scheme, the existing connection between the calling switch and the home switch is extended to the visiting switch. Under the two-phase cranked back scheme, first a local node is computed by using prior art dynamic COS search schemes. Then, the existing connection is crank backed to this local node, and then a new connection segment between the local node and the visiting switch is established. Either of the two schemes results in a suboptimal connection which must be optimized under the second phase of present invention two-phase location management scheme.

Figure 5:
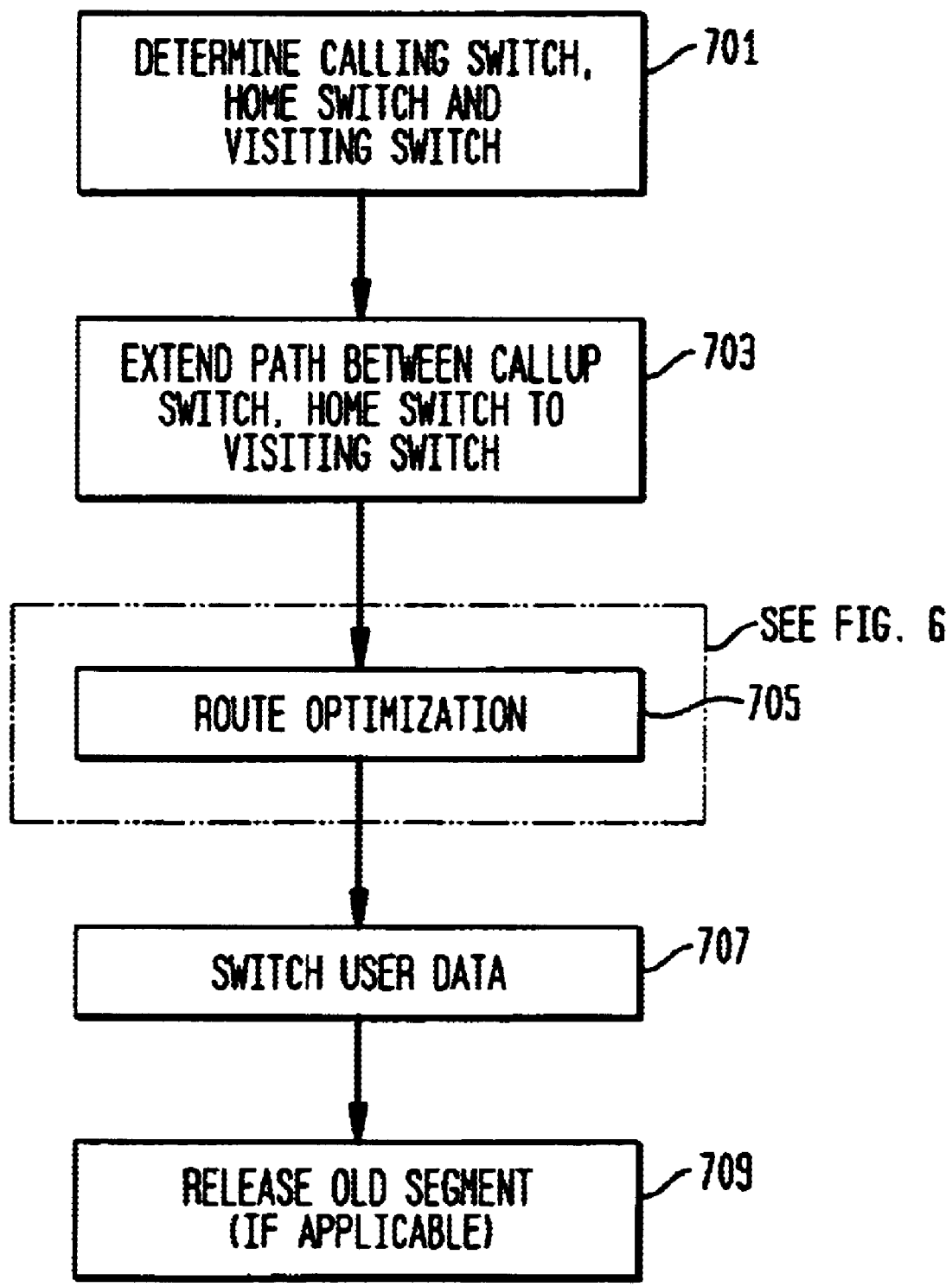
FIG. 5 is flowchart illustrating an alternative embodiment of the present invention.

Referring now to FIG. 5, at step 701, the calling switch c, home switch h, and visiting switch v are determined.

Next, in step 703, a connection extension is performed by using call-forwarding or two-phase crankback scheme. Depending upon whether call forwarding was used or two phase crankback was used, the extended path is c-h-v (calling switch—home switch—visiting switch) or c-L-v (calling switch—local node—visiting switch). This extended path is sub-optimal as it is a simple extension without any consideration to route optimization.

At step 705, route optimization technique is applied, in which a segment on the extended path is selected for rerouting then a optimal crossover node is determined, and an optimal path is computed. A detailed explanation of the route optimization technique may be found in FIG. 6 and its related description.

After the. optimal path has been computed, a new segment is set up between the optimal crossover node and node t, then, in step 707, the user data is switched to the new segment from the corresponding old segment. The corresponding old segment on the old connection is the segment between optimal crossover node and old location. After the user data has been switched, the old segment is released in step 709.

Figure 6:
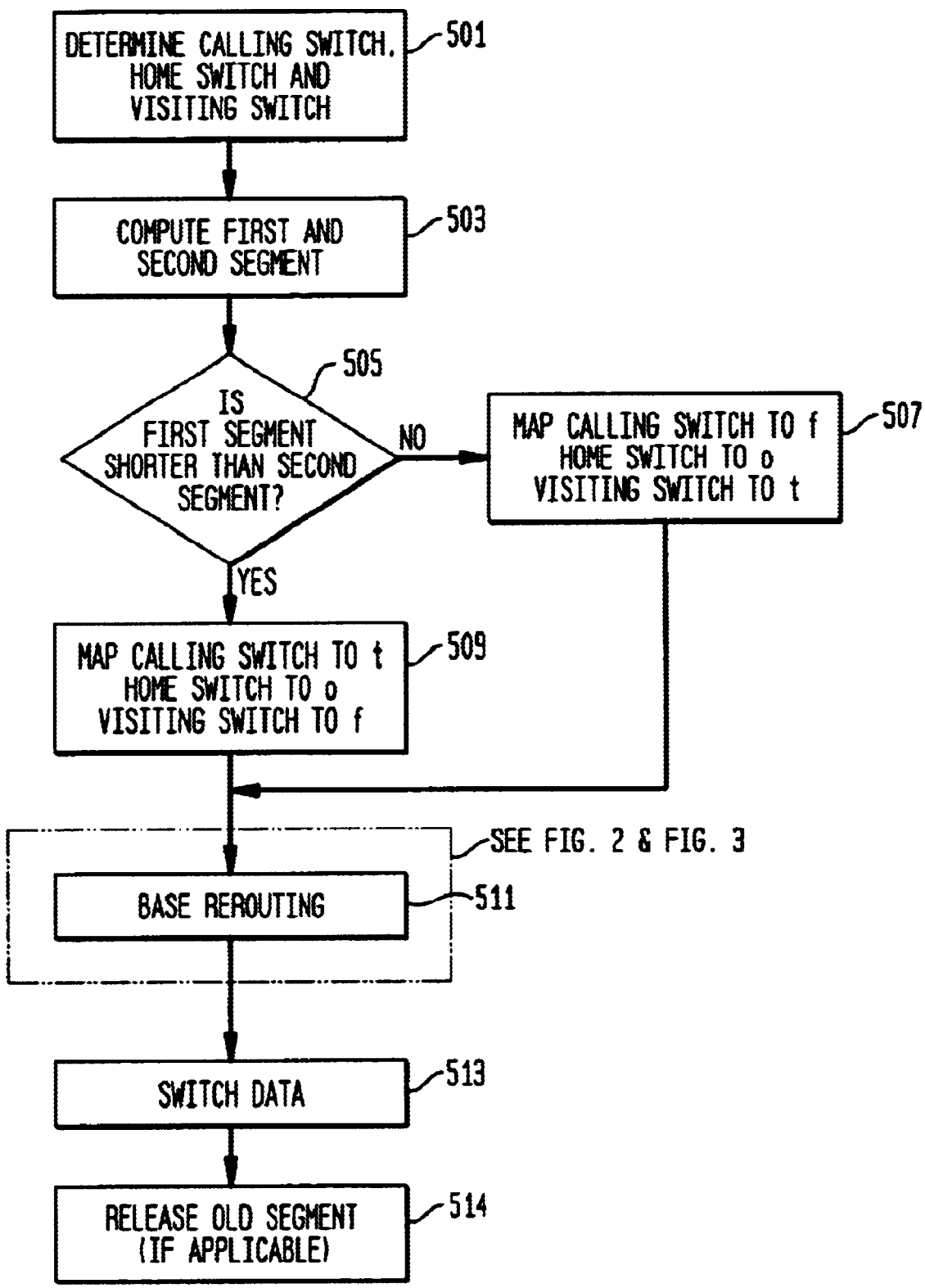
FIG. 6 is a flowchart illustrating the steps involved in the route optimization step of FIG. 5.

FIG. 6 illustrates the steps involved in a route optimization step 705 of FIG. 6.

The route optimization mechanism is applicable where a sub-optimal path exists which must be made optimal. In a typical case, a sub-optimal path exists because of connection path extension performed in step 703 of FIG. 5. A sub-optimal path may also exist if the old connection experienced a fault and a fast reroute was performed around the location of the fault.

At step 501, calling switch c, home switch h (or local node L, if two-phase crankback scheme was used), and visiting switch v are determined. The existing sub-optimal path comprises c-h-v (or c-L-v), and an optimal path is required between the c and v.

There are two segments to this sub-optimal connection. The first segment is c-h (or c-L) and the second segment is h-v (or L-v). The next step 505 is a decision function to determine which of the two segments should be selected for routing. Either the first segment c-h (or c-L) segment will be routed towards v or the second segment h-v (or L-v) will be routed towards c.

This step involves selecting a segment of the sub-optimal path based on some set parameters. In preferred embodiment, this set parameter is distance. The process will select the segment which will reduce the distance of the connection path. Thus, first the distances of both segments are determined.

If it is decided in step 505 that the first segment is shorter than the second segment, then the second segment will be rerouted toward the origination network node. This is accomplished by mapping node c to node t, the h node (or L) to node o, and node v to node f in step 507.

If the second segment is shorter than the first segment, then the first segment will be rerouted towards v. This is accomplished by mapping c to node f, h (or L) to node o, and v to node t.

Once f, o, t, nodes have been mapped, the route optimization technique relies on the base reroute method (FIG. 2–FIG. 4) to compute the optimal crossover node X and setup a new segment X-t in step 511. To set up the new segment between the optimal optimal crossover node and t, the identity of a physical level where optimal crossover node is located is required. The prior art provides COS_SELECT scheme where crossover switch select is sent along the existing connection.

Once the new segment has been set up, the data is switched from the old segment to the new segment in step 513 and old segment is released in step 514. Once again tail signals may be used to accomplish the release. The transit nodes on the old connection release the connection in the appropriate direction upon the receipt of corresponding tail signals.

The above describes two embodiments of the present invention—one phase location management scheme and two phase location management scheme. Both schemes (one location management scheme and two phase location management scheme) are applicable to support mobile endpoints. In one phase scheme, an optimal routed connection to the current location mobile is construed during the call setup procedure, thereby eliminating the need for separate route optimization. In two phase location management scheme the call is delivered to mobile on a suboptimal route (first phase) and a route optimization (second phase) is performed subsequently to achieve an optimal route.

Both schemes are applicable to communications networks deploying connection oriented technologies. These communications network include mobile ATM and mobile IP networks.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

We claim:

1. A method for location management of a mobile in a communications network, said communications network comprises an calling switch, a home switch, and a visiting switch, said home switch being the default network node for said mobile user and said visiting switch is a temporary network node for said mobile user because said mobile user has moved, and an optimal connection is desired between said calling switch and said visiting switch, said communications network comprising a plurality of interconnectable network nodes, said method comprising:

setting up a connection path from said calling switch to said home switch of said mobile user;

determining a location of said visiting switch;

determining an optimal crossover node, said optimal crossover node being a network node located on said connection path;

cranking back said connection path from said home switch until said optimal crossover node is reached; and setting up a connection between said crossover node and said visiting switch wherein said step of determining a optimal crossover node comprises the steps of:

determining a shortest path between said first calling switch and said visiting switch along said plurality of interconnectable network nodes;

determining a portion of said shortest path and said existing connection that coincide; and determining a network node on said coinciding portion of said shortest path and said existing connection that is farthest from said first calling switch, said network node being said optimal crossover node.

2. The method of claim 1, said optimal crossover node is said calling switch.

3. A method for location management of a mobile in a communications network, wherein said mobile network is a hierarchical network, said communications network comprises a calling switch, a home switch, and a visiting switch, said home switch being the default network node for said mobile user and said visiting switch is a temporary network node for said mobile user because mobile user has moved, and an optimal connection is desired between said calling switch and said visiting switch, said communications network comprising a plurality of interconnectable network nodes, said method comprising:

setting up a connection path from said calling switch to said home switch of said mobile user;

determining a location of said visiting switch;

determining an optimal crossover node, said optimal crossover node being a network node located on said connection path;

cranking back said connection path from said home switch until said optimal crossover node is reached; and setting up a connection between said crossover node and said visiting switch;

wherein said step of determining a optimal crossover node comprises the steps of:

determining a provisional crossover node;

determining whether a hierarchical path is available in said hierarchical network;

determining whether another network node can further modify the existing path;

(i) selecting a level in said hierarchical network at which ancestors of said home switch and visiting switch are siblings;

(ii) determining a shortest path between said calling switch and said visiting switch along said plurality of interconnectable network nodes;

(iii) determining a portion of said shortest path and said existing connection that coincide;

(iv) determining a network node on said coinciding portion of said shortest path and said existing connection that is farthest from said calling switch, said network node being said optimal crossover node;

(v) selecting the next lower level in said hierarchical network and applying the iteration of step (ii), (iii), (iv);

(vi) iteratively repeating steps (ii)–(v) until the lowest physical level in the hierarchical network has been reached; and determining said optimal crossover node.

4. The method of claim 3, wherein said provisional crossover node is an ingress border of a peer group in which ancestors of said home switch and said visiting switch are siblings, and said provisional crossover node is said optimal crossover node.

5. The method of claim 3, wherein said provisional crossover node is said calling switch.

6. The method of claim 3, wherein said provisional crossover node is said optimal crossover node.

7. The method of claim 1, wherein said mobile network is a PNNI hierarchical network and said step of determining a optimal crossover node comprises the steps of:

determining whether said home switch is closer to said second calling switch or said visiting switch; and determining a optimal crossover node under PNNI constraints.

8. The method of claim 7, wherein said calling switch is said optimal crossover node.

9. The method of claim 7, wherein said home switch is closer to said visiting switch than to said calling switch, and said optimal crossover node is an ingress border of a peer group in which ancestors of said home switch node and said visiting switch are siblings.

10. A method for location management of a mobile user in a communications network, said communications network comprising a calling switch, a home switch, and a visiting switch, said home switch being the default network node for said mobile user and said visiting switch being a temporary network node for said mobile user, and wherein an optimal connection is desired between said calling switch and said visiting switch, said communications network comprising a plurality of interconnectable network nodes, said method comprising:

establishing a connection path between said calling switch and said home switch, said connection path comprising a first segment; extending said existing connection path to said visiting switch by setting up a connection between said home switch and said visiting switch, said connection between said home switch and said visiting switch comprising a second segment;

selecting one of said segments on said extended path based on a predetermined parameter;

determining a first network node, a second network node, and a third network node for said selected segment;

determining an optimal crossover node using said first network node, said second network node, and said third network node, said optimal crossover node being a network node located along the path of said existing connection;

setting up a new connection path between said optimal crossover node and said visiting switch; and switching information from said exiting connection path to said new connection path.

11. The method of claim 10, wherein said step of selecting a segment further comprises the steps of:

comparing said first segment path and second said second segment;

determining a shorter segment path and a longer segment path from said first segment path and said second segment path; and selecting said longer segment path.

12. The method of claim 10, wherein said first network node is said calling switch, said second network node is said home switch and said third network node is said visiting switch.

13. The method of claim 12, wherein said mobile network is a PNNI hierarchical network and said step of determining a crossover node comprises the steps of:

determining whether said second node is closer to second first node or to said third node; and determining a optimal crossover node under PNNI constraints.

14. The method of claim 13, wherein said optimal crossover node is an ingress border of a peer group in which ancestors of said first network node and said third network node are siblings.

15. The method of claim 10, wherein said first network node is said visiting switch, said second network node is said home switch and said third network node is said calling switch.

16. The method as set forth in claim 10, further comprising the steps of:

determining an old segment path between said optimal crossover node and said second network node; and releasing said old segment path.

17. The method of claim 10, and wherein said step of determining a optimal crossover node further comprises the steps of:

determining a shortest path between said first network node switch and said third network node along said plurality of interconnectable network nodes;

determining a portion of said shortest path and said existing connection that coincide; and determining a fourth network node on said coinciding portion of said shortest path and said existing connection that is farthest from said first network node, said fourth network node being said optimal crossover node.

18. The method of claim 10, said optimal crossover node is said calling switch.

19. The method of claim 10, wherein said mobile network is a hierarchical network, and said step of determining a optimal crossover node comprises the steps of:

determining a provisional crossover node;

determining whether a hierarchical path is available in said hierarchical network;

determining whether another network node can further modify the existing path; and determining an optimal crossover node.

20. The method of claim 19, wherein said provisional crossover node is an ingress border of a peer group in which ancestors of said second network node and said third network node are siblings, and said provisional crossover node is said optimal crossover node.

21. The method of claim 19, said provisional crossover node is said first network node.

22. The method of claim 19, said provisional crossover node is said optimal crossover node.

23. The method of claim 19, wherein step of determining optimal crossover node comprises the steps of:

(i) selecting a level in said hierarchical network at which ancestors of said home switch and visiting switch are siblings;

(ii) determining a shortest path between said first network node and said third network node along said plurality of interconnectable network nodes;

(iii) determining a portion of said shortest path and said existing connection that coincide;

(iv) determining a network node on said coinciding portion of said shortest path and said existing connection that is farthest from said first network node, said network node being said optimal crossover node;

(v) selecting the next lower level in said hierarchical network and apply the iteration of step (ii), (iii), (iv);

(vi) iteratively repeating steps (ii)–(v) until the lowest physical level in the hierarchical network has been reached.

24. A method for location management of a mobile user in a communications network, said communications network comprising a calling switch, a home switch, and a visiting switch, said home switch being the default network node for said mobile and visiting switch is a temporary network node for said mobile user, and wherein an optimal connection is desired between said calling switch and said visiting switch, said communications network comprising a plurality of interconnectable network nodes, said method comprising:

determining a local node based on pre-determined parameters;

establishing a connection path between said calling switch and said home switch;

cranking back said connection path from said home switch to said local node;

extending said existing connection path to said visiting switch by setting up a connection between said local node and said visiting switch, said connection between said local node and said visiting switch comprising a second segment;

selecting one of said segments on said extended path based on a predetermined parameter;

determining a first network node, a second network node, and a third network node for said selected segment;

determining a optimal crossover node using said first network node, said second network node, and said third network node;

setting up a new connection path between said optimal crossover node and said visiting switch; and switching user data from said exiting connection path to said new connection path.

25. The method of claim 24, wherein said step of selecting a segment further comprises the steps of:

comparing said first segment path and second said second segment;

determining a shorter segment path and a longer segment path from said first segment path and said second segment path; and selecting said longer segment path.

26. The method of claim 25, wherein said mobile network is a PNNI hierarchical network and said step of determining a optimal crossover node comprises the steps of:

determining whether said second network node is closer to said first network node or to said third network node; and determining a optimal crossover node under PNNI constraints.

27. The method of claim 26, wherein said first network node is said optimal crossover node.

28. The method of claim 26, said optimal crossover node is an ingress border of a peer group in which ancestors of said first network node and said third network node are siblings.

29. The method of claim 24, wherein said first network node is said calling switch, said second network node is said home switch and said third network node is said visiting switch.

30. The method of claim 24, wherein said first network node is said visiting switch, said second network node is said home switch and said third network node is said calling switch.

31. The method as set forth in claim 24, further comprising the steps of:

determining an old segment path between said optimal crossover node and said home switch; and releasing said old segment path.

32. The method of claim 24, and wherein said step of determining a optimal crossover node further comprises the steps of:

determining a shortest path between said calling switch and said visiting switch along said plurality of interconnectable network nodes;

determining a portion of said shortest path and said existing connection that coincide; and determining a fourth network node on said coinciding portion of said shortest path and said existing connection that is farthest from said first network node, said fourth network node being said optimal crossover node.

33. The method of claim 26, said optimal crossover node is said first network node.

34. The method of claim 26, wherein said mobile network is a hierarchical network, and said step of determining a optimal crossover node comprises the steps of:

determining a provisional crossover node;

determining whether a hierarchical path is available in said hierarchical network;

determining whether another network node can further modify the existing path; and determining an optimal crossover node.

35. The method of claim 33, wherein said provisional crossover node is an ingress border of a peer group in which ancestors of said second network node and said third network node are siblings, and said provisional crossover node is said optimal crossover node.

36. The method of claim 34, said provisional crossover node is said first network node.

37. The method of claim 34, said provisional crossover node is said optimal crossover node.

38. The method of claim 34, wherein said step of determining optimal crossover node comprises the steps of:

(i) selecting a level in said hierarchical network at which ancestors of said first network node and said third network node are siblings;

(ii) determining a shortest path between said first network node and said third network node along said plurality of interconnectable network nodes;

(iii) determining a portion of said shortest path and said existing connection that coincide;

(iv) determining a network node on said coinciding portion of said shortest path and said existing connection that is farthest from said first network node, said network node being said optimal crossover node;

(v) selecting the next lower level in said hierarchical network and apply the iteration of step (ii), (iii), (iv); and (vi) iteratively repeating steps (ii)–(v) until the lowest physical level in the hierarchical network has been reached.

* * * * *